(No Model.) 2 Sheets—Sheet 1.

J. RAPIEFF.
ELECTRICAL LOCATION AND RANGE FINDING INSTRUMENT.

No. 441,973. Patented Dec. 2, 1890.

WITNESSES:
H. F. Parker
Chas. Hanimann

INVENTOR
John Rapieff
Chas. W. Forbes
BY ATTY.

(No Model.) 2 Sheets—Sheet 2.
J. RAPIEFF.
ELECTRICAL LOCATION AND RANGE FINDING INSTRUMENT.
No. 441,973. Patented Dec. 2, 1890.
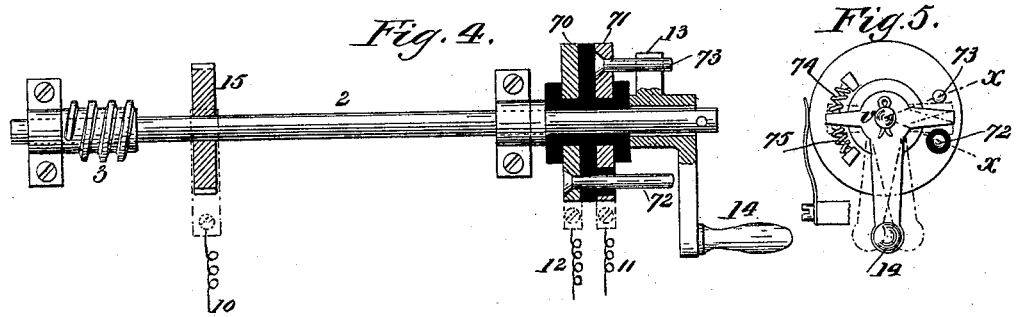
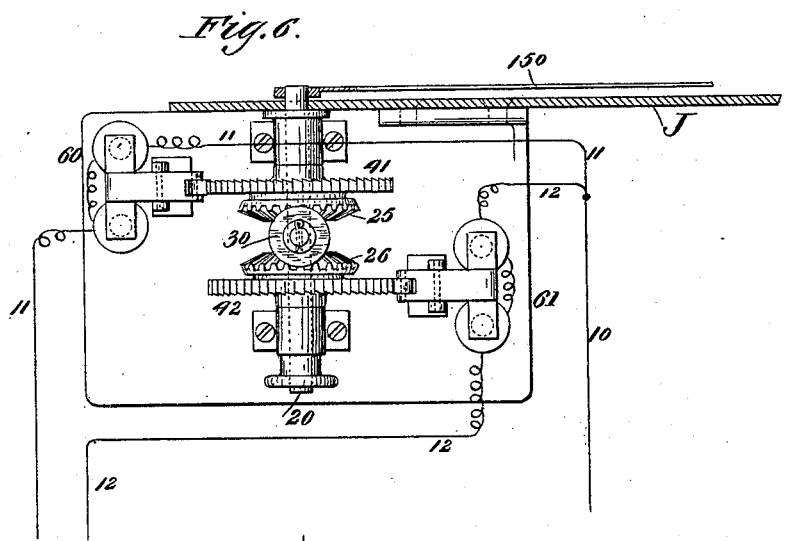
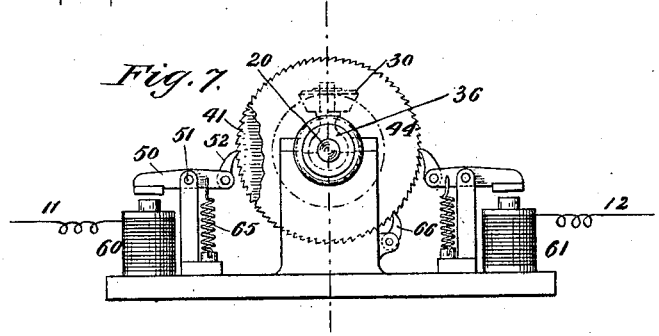
WITNESSES: INVENTOR

UNITED STATES PATENT OFFICE.

JOHN RAPIEFF, OF NEW YORK, N. Y.

ELECTRICAL LOCATION AND RANGE FINDING INSTRUMENT.

SPECIFICATION forming part of Letters Patent No. 441,973, dated December 2, 1890.

Application filed March 10, 1890. Serial No. 343,361. (No model.)

*To all whom it may concern:*

Be it known that I, JOHN RAPIEFF, a subject of the Czar of Russia, residing at the city, county, and State of New York, have invented certain new and useful Improvements in Electrical Indicating Apparatus for Range and Location Finding Instruments, of which the following is a specification.

My invention relates to apparatus for indicating the range and location of a distant object at a point of observation also distant from the range-finding instrument; and my said invention is applicable to an instrument in which the variable angles of two telescopes or alidades, with reference to a given base-line, bear a known relation to the range or the location of the distant object.

My invention consists of a plane table or dial having independent indices representing the vision-lines of the telescopes, and of electrical transmitting apparatus for sychronizing the movements of the indices with those of the respective telescopes, whereby the range and location of an object is graphically indicated.

Figure 1:
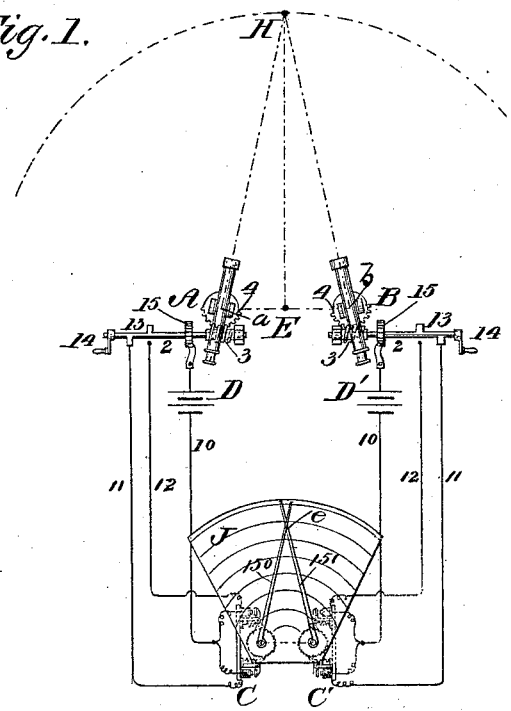
Figure 2:
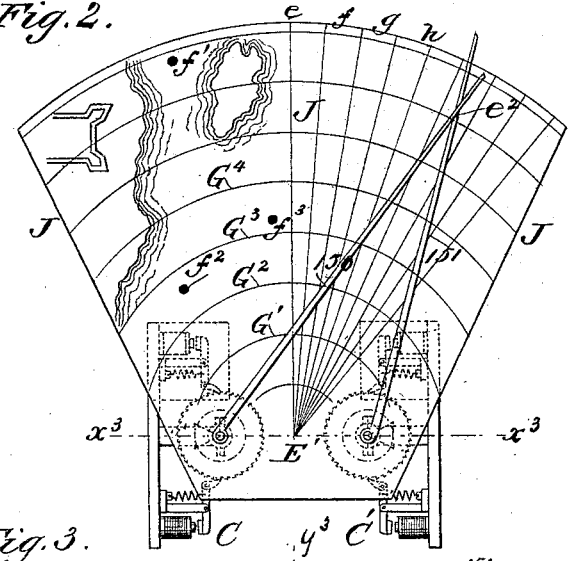
Figure 3:
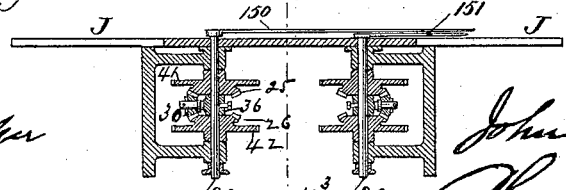

Referring to the accompanying drawings, in which similar characters of reference indicate corresponding parts, Figure 1 is a diagram showing a range-finding instrument in plan view, also the plane table or dial and the electrical apparatus and its connections. Fig. 2 is an enlarged plan view of the plane table or dial. Fig. 3 is a cross-section of Fig. 2 on the line $x^3 \, x^3$. Fig. 4 is an enlarged detail view of the operating-shaft of a telescope, partly in section on the line $x \, v \, x$, Fig. 5; and Fig. 5 an end view of Fig. 4. Fig. 6 is an elevation, partly in section on the line $y^3 \, y^3$, Fig. 3, of the electrical operating mechanism of the index-shaft enlarged, and Fig. 7 an end elevation of Fig. 6.

The general character of the electrical transmitting apparatus herein illustrated corresponds to that described and claimed in my separate patent-application filed simultaneously herewith.

A B, Fig. 1, represent two telescopes movable at variable angles to the given base-line $a \, b$, to which the pivots of the instruments are terminal.

C C' represent the parts of the indicating mechanism pertaining to the two indices 150 151 and D D', the batteries whereby electric circuits are generated, which are controlled by the various movements of the telescopes A B to produce corresponding movements of the indicating mechanism through the electro-magnets 60 63.

J is the plane table or dial upon which the indices move so as to intersect at various points, such as $e'$, Fig. 1, or $e^2$, Fig. 2.

G' G², &c., are range-circles representing a scale of distances.

2 are the operating-shafts of the telescopes, each having a worm 3, which engages with a segmental rack 4, rotative with the telescope.

10 is the main wire of the independent circuit of each battery.

11 12 are branches of the circuit, and 13 is an electric switch (shown diagrammatically in Fig. 1, but more fully in Figs. 4 and 5) by means of which the current is directed through the one or the other of the branches 11 12.

15 is an interrupting-wheel interposed in the mutual line of the circuit to interrupt the current during either direction of rotation of the crank 14.

20 20 are the index-shafts of the indicating mechanism which is located at any desired distance or position with reference to the instruments A B. The indices are operated by systems of "sun-and-planet" gearing, of which 25 and 26 are opposite bevel-gears loose upon the shaft 20, and 30 the intermediate or planet bevel-gear rotative upon an axis fixed radially to the shaft 20 by means of the arm 36, so as to carry the same with it.

41 42 are ratchet-wheels connected to the opposite gears 25 26, and alternately actuated by the electro-magnets 60 61. The ratchet-wheels 41 42 have oppositely-inclined teeth, and the armature-levers 50 of the electro-magnets bear pawls 52, engaging with said teeth, whereby the planet wheel and index are moved in opposite directions by the respective magnets. The stop-pawls 66 prevent back motion, and each movable pawl 52 and armature is provided with a returning-spring 65.

The switch (more fully shown in Figs. 4 and 5) consists of two insulated contact-disks 70 71, which have continuous contact with the branch wires 11 12, while the interrupting contact-wheel 15, intermittently connected to the main wire 10, is electrically connected with the operating-shafts 2. The crank 14, bearing the switch contact-arm 13, is also electrically connected to the shafts 2, while rotatively loose thereon to an extent limited by the stops 72 73, which stops form contacts electrically connected to the disks 70 71, respectively. The switch is normally at the open position shown in Fig. 5 when at rest, breaking the circuit, and is so retained by the springs 74, the shaft 2 being retained frictionally in its bearings, whereby the springs 74 are first overcome and an electric contact closed through the stops 72 or 73 by the rotation of the crank in the one direction or the other preparatory to moving the telescope. It will be seen, therefore, that when the operating-crank of a telescope is moved a circuit is first closed through one or the other branches 11 12, according to the direction of rotation. Then the circuit is interrupted for each unit of motion of the telescope, producing corresponding units of motion of one or another ratchet-wheel, according to which of the electro-magnets are included.

In the diagram Fig. 1 the indices are represented as actually parallel with the vision-lines of the telescopes, the gearing and division of the interrupting-wheels being such as to impart equal angles of movement and maintain the said parallel relation. It is obvious, of course, that the dial J may be placed in any position, horizontally or vertically, irrespective of the instruments or points of compass.

In the operation of the instrument an operator is stationed at each telescope A B and the vision-lines directed upon a common distant object. The observer at the indicator obtains a direct reading of the distance by the point of intersection of the inner edges of the indices upon the range-circles G', $G^2$, &c., which circles may be graduated by additional intervening circles. The location is read by the position of the indices, and the angle of a line projected from the central point of the base-line intersecting the object may be computed from the perpendicular or other standard line E' e by means of a degree-scale composed of lines radiating from E' to $f\ g\ h$, &c., as indicated.

The proportion of the range to the base-line $a\ b$ is arbitrary, since the distance between the instruments A B may be very considerable, the increase of the same promoting accuracy and being practicable for permanently-stationed instruments. In such instruments a map, such as K, of the harbor or other surroundings of the range-finding instrument (within the limit of horizon included) may be adjusted upon the plane table J, the positions of the index-shafts 20 corresponding to the actual geographical positions of the telescope-pivots $a\ b$. In an instrument for harbor or coast defense the location of submarine torpedoes may be indicated upon the map, as at $f'\ f^2\ f^3$, &c., which when coincident with the position of a hostile vessel indicated by the indices may be electrically discharged from the observer's station.

Having thus fully described my invention, what I claim, and desire to secure by Letters Patent, is—

1. The combination, in a range-finding instrument, of two telescopes or alidades movable at variable angles to a given base-line, independent indices having intersecting edges representing the vision-lines of the telescopes, and electrical transmitting apparatus, substantially as described, for synchronizing the movements of the indices with those of the respective telescopes.

2. The combination, in a range-finding instrument, of two telescopes or alidades movable at variable angles to a given base-line, independent indices intersecting to represent the vision-lines of the telescopes, a plane table or dial having arcs thereon concentric with a point intermediate between the pivots of the indices representing a scale of ranges, and electrical transmitting apparatus, substantially as described, for synchronizing the movements of the indices with those of the respective telescopes.

3. The combination of two telescopes or alidades movable at variable angles to a given base-line bearing a definite geographical relation, and a range and location indicator consisting of a plane table and map, independent indices intersecting to represent the vision-lines of the telescope and movable at variable angles to a given base-line bearing a corresponding definite relation to the map, and electrical transmitting apparatus, substantially as described, for synchronizing the movements of the indices with those of the respective telescopes.

JOHN RAPIEFF.

Witnesses:
CHAS. W. FORBES,
CHAS. HANIMANN.